(12) United States Patent
Walker

(10) Patent No.: US 9,837,889 B2
(45) Date of Patent: Dec. 5, 2017

(54) POWER CONVERTER WITH INDUCTANCE INVARIANCE

(71) Applicant: Supertex, Inc., Sunnyvale, CA (US)

(72) Inventor: James T. Walker, Palo Alto, CA (US)

(73) Assignee: Microchip Technology Inc., Chandler, AZ (US)

( * ) Notice: Subject to any disclaimer, the term of this patent is extended or adjusted under 35 U.S.C. 154(b) by 48 days.

(21) Appl. No.: 13/946,952

(22) Filed: Jul. 19, 2013

(65) Prior Publication Data

US 2015/0022176 A1    Jan. 22, 2015

(51) Int. Cl.
   *H02M 1/42* (2007.01)
   *H05B 33/08* (2006.01)

(52) U.S. Cl.
   CPC ...... *H02M 1/4225* (2013.01); *H05B 33/0818* (2013.01); *Y02B 70/126* (2013.01)

(58) Field of Classification Search
   CPC ............................ H02M 3/156; H02M 3/158
   USPC ........................................................ 323/222
   See application file for complete search history.

(56) References Cited

U.S. PATENT DOCUMENTS

| | | | | |
|---|---|---|---|---|
| 5,015,918 A | * | 5/1991 | Copeland ................. | B62J 6/003 315/179 |
| 5,856,917 A | * | 1/1999 | Aonuma ............. | H02M 1/4225 323/222 |
| 6,469,917 B1 | * | 10/2002 | Ben-Yaakov ....... | H02M 1/4225 323/222 |
| 2011/0001460 A1 | * | 1/2011 | Buthker .............. | H02M 3/1588 323/283 |
| 2012/0217894 A1 | * | 8/2012 | Chang et al. .................. | 315/265 |
| 2013/0088161 A1 | * | 4/2013 | Lu ...................... | H05B 33/0824 315/200 R |

* cited by examiner

*Primary Examiner* — Adolf Berhane
*Assistant Examiner* — Bart Iliya
(74) *Attorney, Agent, or Firm* — DLA Piper LLP (US)

(57) ABSTRACT

An improved power converter is disclosed.

3 Claims, 7 Drawing Sheets

CONSTANT DUTY CONVERTER WITH POWER COMPENSATION AND RESISTIVE INPUT IMPEDANCE

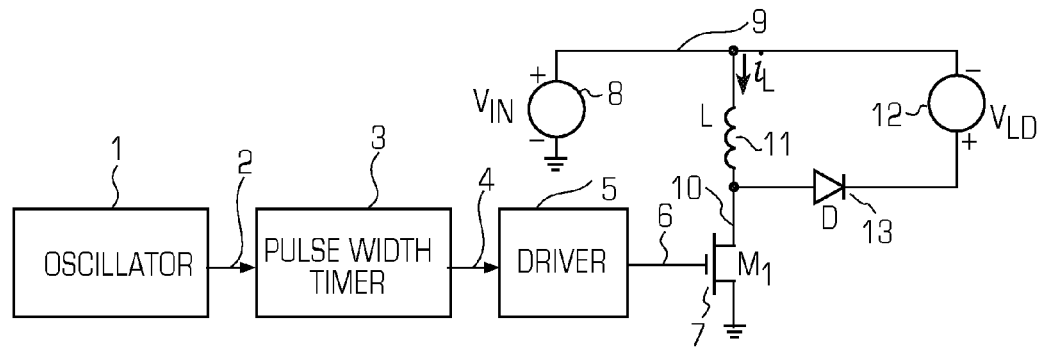
FIGURE 1: FLYBACK POWER CONVERTER (PRIOR ART)
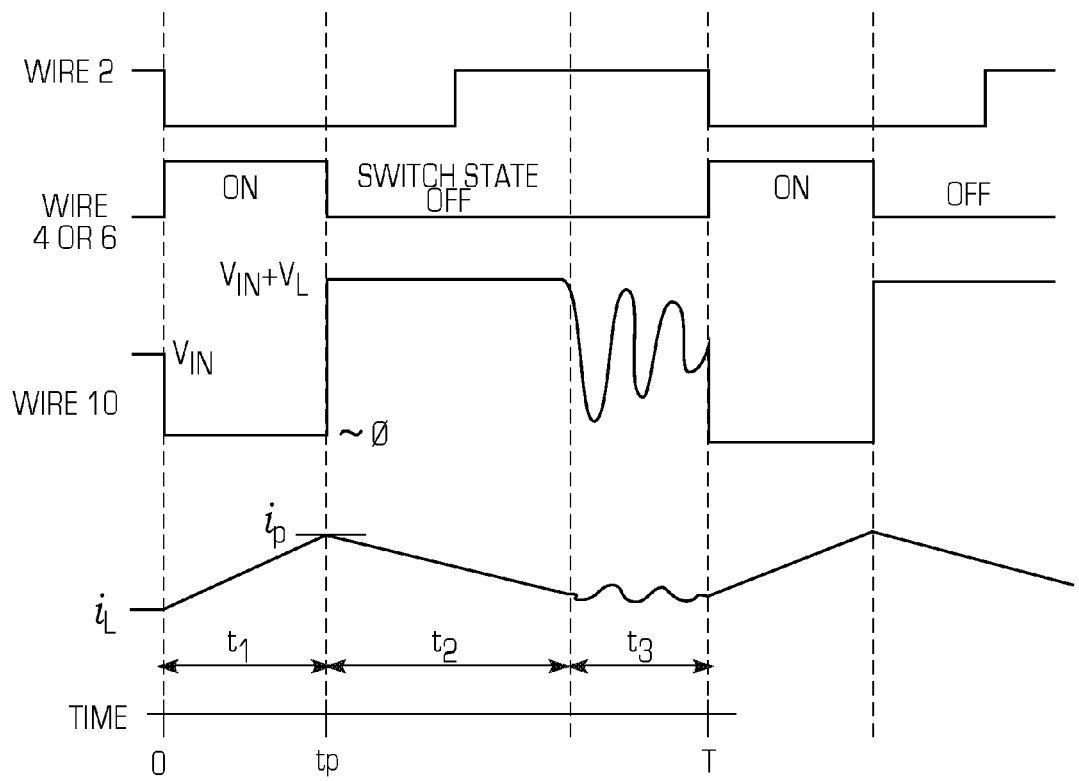
FIGURE 2: OPERATION WAVEFORMS

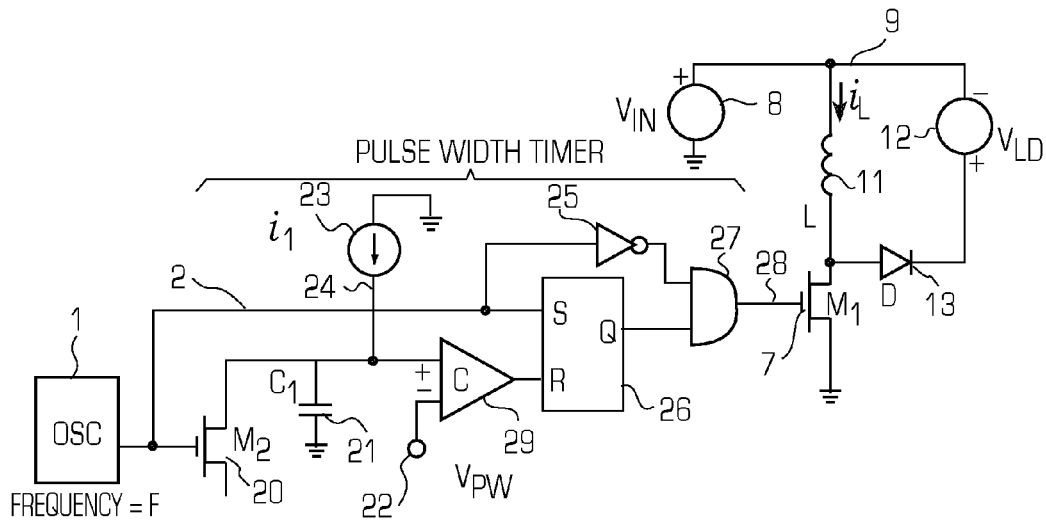

USING $I = C \frac{dV}{dt}$, WE GET $T_{PW} = \frac{C_1 V_{pw}}{i_1}$  eq (1)

DEFINE  E = ENERGY PER PULSE
        P = AVERAGE POWER

USING $E = 1/2 L i_p^2$ AND $V = L\frac{di}{dt}$, $$P = FE = \frac{F}{2} L \left[\frac{V_{IN} \, t_{pw}}{L}\right]^2 = V_{IN}^2 \left(\frac{F t_{pw}^2}{2L}\right) \qquad \text{eq (2)}$$

BUT $P = \frac{V_{IN}^2}{R_{IN}} => R_{IN} = \frac{2L}{F t_{pw}^2}$  eq (3)

SUBSTITUTE FROM eq(1) FOR $t_{pw}$, $$P = \frac{V_{IN}^2}{i_1^2} \left[\frac{F C_1^2 V_{pw}}{2L}\right] => i_1 = V_{IN} \left(\frac{F}{2LP}\right)^{1/2} C_1 V_{pw} \qquad \text{eq (4)}$$

FIGURE 4: CONSTANT DUTY CONVERTER EQUATIONS

CONSTANT DUTY CONVERTER WITH POWER COMPENSATION AND RESISTIVE INPUT IMPEDANCE

CONSTANT PEAK CURRENT POWER CONVERTER

INDUCTOR PEAK CURRENT $i_p = \dfrac{V_{CS}}{R_{CS}} = \dfrac{V_{PW}}{R_{CS}} = \dfrac{V_{IN} t_p}{L}$  eq (5)
DEFINE  E = ENERGY PER PULSE
        P = AVERAGE POWER
$P = FE = \dfrac{F}{2} L i_p^2 = \dfrac{FLV_{PW}^2}{2R_{CS}^2}$  eq (6)
$P = V_{IN} I_{IN} => I_{IN} = \dfrac{P}{V_{IN}}$  eq (7)
FIGURE 7: CONSTANT PEAK CURRENT CONVERTER EQUATIONS
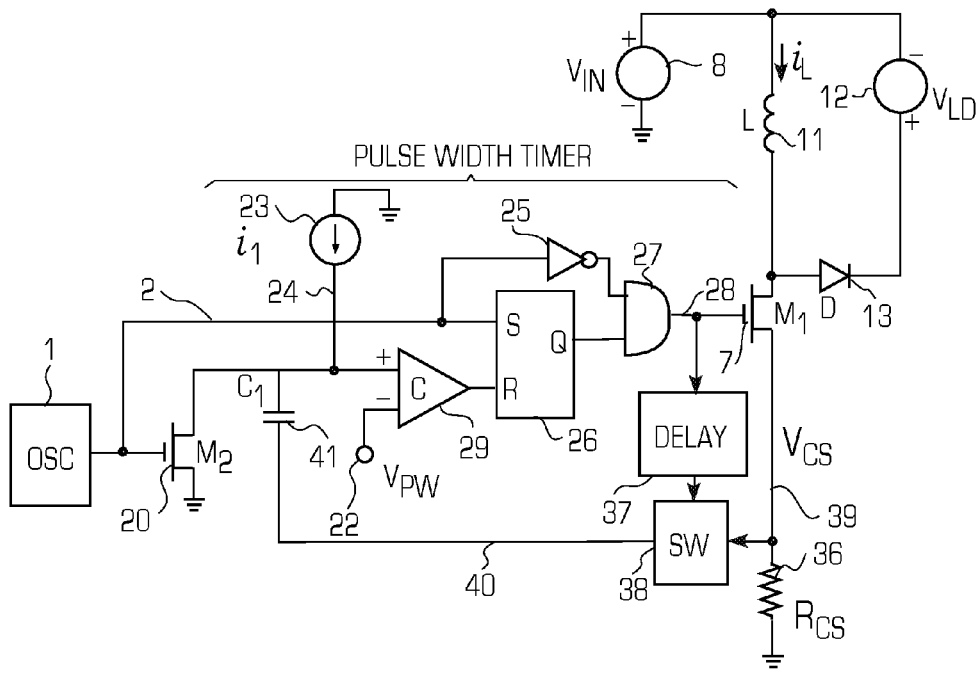
FIGURE 8: INDUCTANCE INVARIANT POWER CONVERTER FROM FIGURE 4 eq (1), $V_{PW} = \dfrac{i_1 tp}{C}$ FROM FIGURE 7 eq (5), $V_{PW} = \dfrac{V_{IN} tp R_{CS}}{L}$

ADDING GIVES FOR FIG 9

$$V_{pw} = \left(\dfrac{i_1}{C} + \dfrac{V_{IN} R_{CS}}{L}\right) tp \qquad \text{eq (8)}$$

USING $P = FE = \dfrac{Fi_p^2 L}{2}$ AND $i_p = \dfrac{V_{IN}}{L} tp$ AS BEFORE, $$P = \dfrac{FV_{IN}^2}{2L}\left(\dfrac{V_{pw}}{\dfrac{i_1}{C} + \dfrac{V_{IN} R_{CS}}{L}}\right)^2 = \dfrac{FV_{IN}^2 C^2 V_{pw}^2 L}{2\left(L i_1 + CV_{IN} R_{CS}\right)^2} \qquad \text{eq (9)}$$

IF WE TAKE THE DERIVITIVE OF eq (9) vs L
AND SET $\dfrac{dP}{dL} = 0$, WE GET $$L = \dfrac{CV_{IN} R_S}{i_1} \text{ , OR } \dfrac{i_1}{C} = \dfrac{V_{IN} R_{CS}}{L} \qquad \text{eq (10)}$$

FIGURE 9: INDUCTANCE INVARIANT EQUATIONS

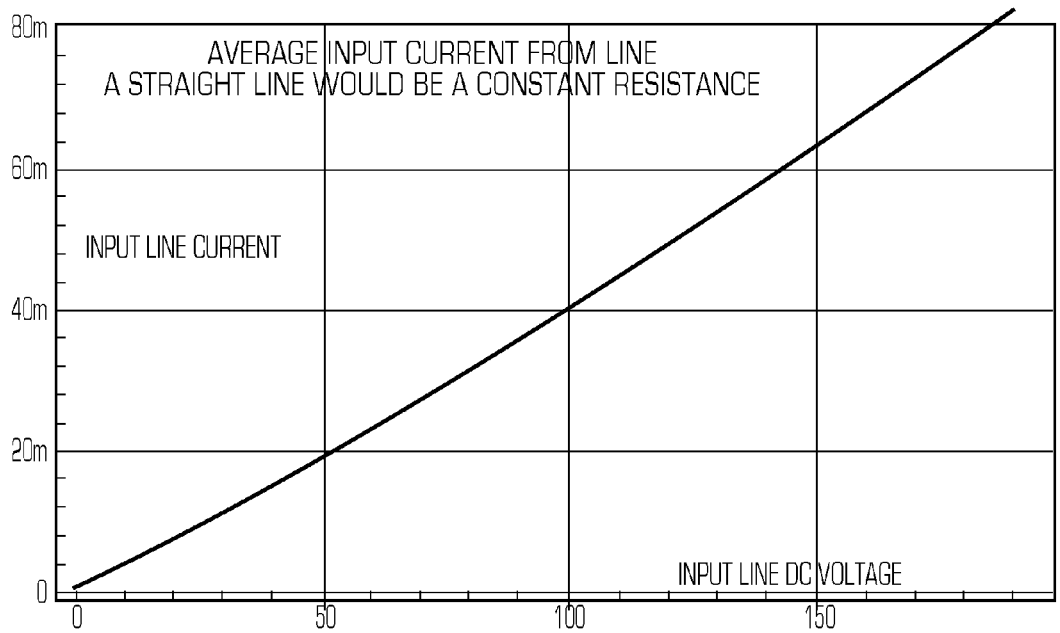
FIGURE 10: COMPENSATED INPUT CURRENT
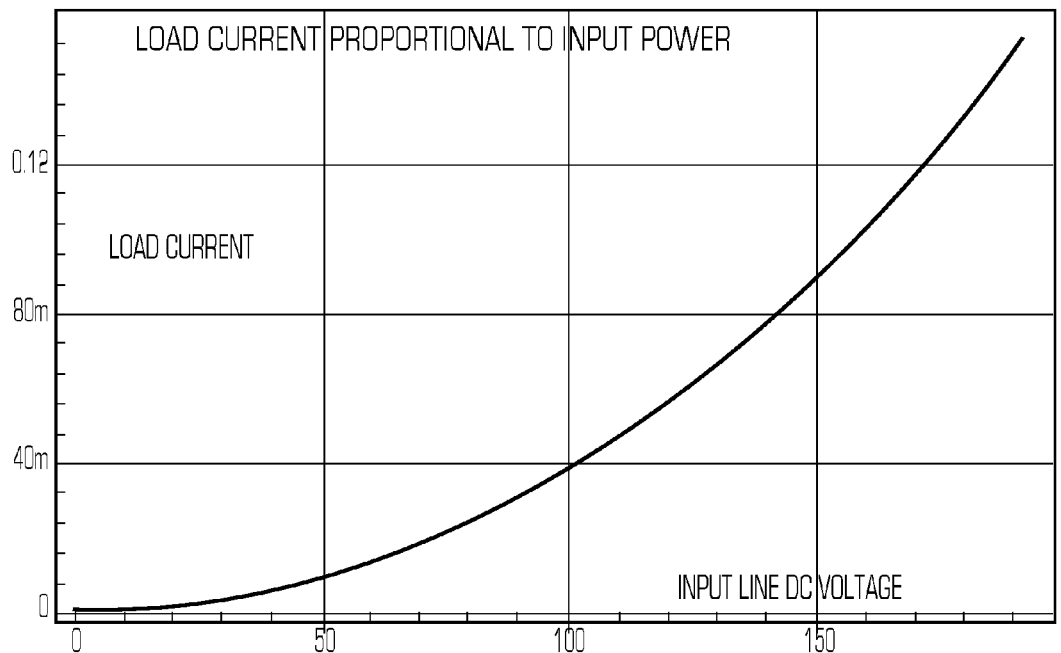
FIGURE 11: COMPENSATED LOAD CURRENT

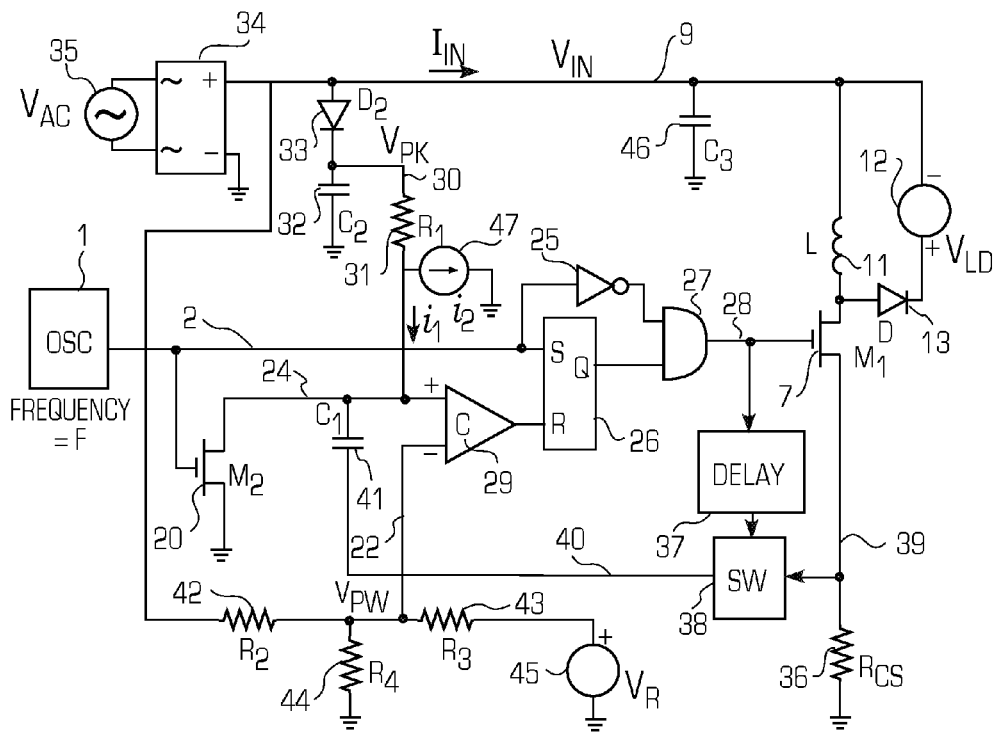
FIGURE 12: CONSTANT DUTY CONVERTER WITH POWER COMPENSATION AND RESISTIVE INPUT IMPEDANCE

US 9,837,889 B2

POWER CONVERTER WITH INDUCTANCE INVARIANCE

FIELD

An improved power converter is disclosed.

BACKGROUND

A light emitting diode (LED) lighting system requires a power converter for changing the AC line voltage received from the utility power line to the DC power specific to the LED load circuit. This power converter has many requirements, some of which are small size, simplicity, efficiency, and high power factor. Power factor is a measure of the input impedance of the power converter in this application, with a value of 1.0 being the ideal value produced by a pure resistive load. When the power factor is less than 1.0, the load under consideration draws more input current than a purely resistive load would draw, for the same amount of real power consumed. Many electronic power converters have power factors of 0.7 or less, with some being as poor as 0.4. Regulatory agencies sometimes require a power factor of greater than 0.90. This is to prevent problems with the AC power distribution system being loaded by current flows which do not do useful work.

BRIEF DESCRIPTION OF THE DRAWINGS

FIG. 1 depicts a prior art flyback power converter.

FIG. 2 depicts waveforms related to the operation of a power converter.

FIG. 3 depicts a prior art constant duty cycle power converter.

FIG. 4 depicts equations relating to a constant duty cycle power converter.

FIG. 7 depicts equations relating to a constant peak current converter.

FIG. 8 depicts an embodiment of an inductance invariant power converter.

FIG. 9 depicts equations relating to an inductance invariant power converter.

FIG. 10 depicts a graph of compensated input current.

FIG. 11 depicts a graph of compensated load current.

FIG. 12 depicts an embodiment of a constant duty converter with power compensation and resistive input impedance.

DETAILED DESCRIPTION OF ONE OR MORE EMBODIMENTS

Figure 5:
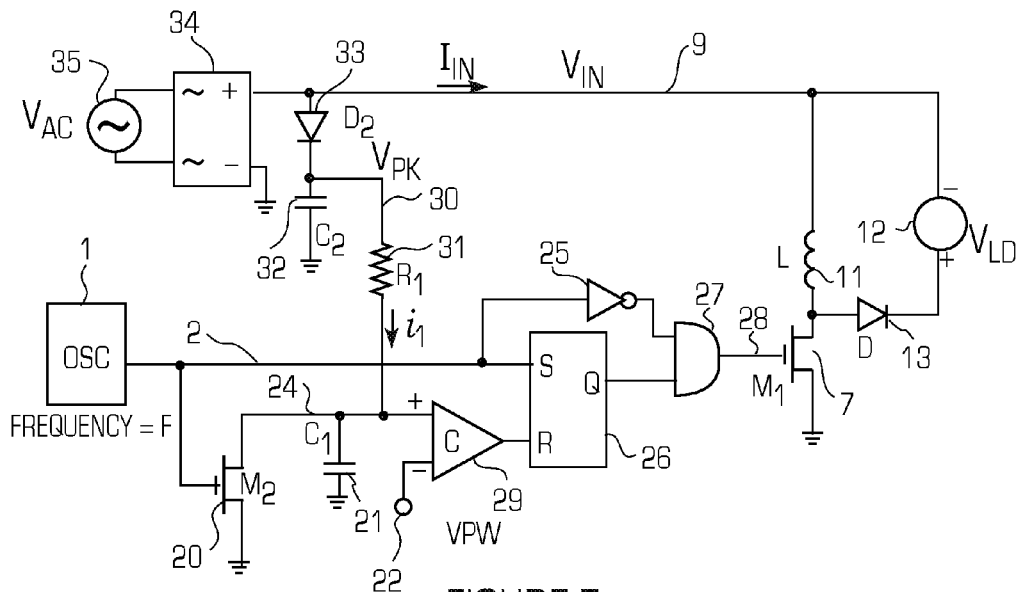
FIG. 5 depicts an embodiment of a constant duty converter with power compensation and resistive input impedance.

One objective of this disclosure is achievement of performance not affected by small deviations from its nominal value of the inductor used to make the power converter. A further objective is a power converter for an LED system which will provide an input power factor close to 1.0 using a simple circuit. An additional objective is a power converter whose input power remains essentially constant even though the input voltage changes. Another objective is to provide power conversion in a small size with a minimum of expensive components. The design proposed here uses only one inductor or transformer and one high voltage power switch to achieve that goal.

Consider the flyback power converter as shown in FIG. 1. This is a standard design as known in prior art. The oscillator 1 provides a constant frequency drive voltage on wire 2, which may typically be a square wave, but could have some other duty cycle characteristic. The pulse width timer 3 outputs a pulse of known width tpw on wire 4 each time the oscillator 1 completes a cycle. If the oscillator 1 has an output with an asymmetric timing characteristic, then the oscillator could be used to directly provide the signal on wire 4. A driver amplifier 5 provides an amplified output on wire 6 which can provide the voltage and current required to operate electronic switch 7. Although switch M1 denoted 7 is shown as an NMOS device here, reflecting the current state of the art, any other controllable current switch could be used, such as a bipolar junction transistor (BJT), metal oxide semiconductor field effect transistor (MOSFET), insulated gate bipolar transistor (IGBT), or other device.

Operation begins with switch 7 connecting the wire 10 to circuit ground, causing the input voltage Vin from the source 8 to be impressed across the inductor 11 with value L. After the pulse time tpw on wire 4, the switch is turned off. Since the inductor tries to maintain its current, the voltage on wire 10 will change from being near ground to being near the sum of the voltages Vin from 8 and Vld across 12. The source 12 represents the load for the power converter and the voltage which it maintains due to the current produced by the power converter. The diode D denoted 13 conducts the inductor current after the switch turns off to the load 12. The load in a typical lighting application would be a group of light emitting diodes (LEDs).

FIG. 2 shows the operation waveforms of the circuit of FIG. 1. This is one of many methods known in the state of the art for operating a flyback power converter. Each time the oscillator waveform on wire 2 goes to a logic low state, it causes the pulse width timer 3 to begin outputting a pulse on wire 4, as shown as the second trace of FIG. 2. The pulse on wire 4 is amplified by the driver 5 and turns on the switch 7. As a result, the voltage on the switch output on wire 10 goes to near zero volts, as determined by the switch residual voltage drop. The current through the inductor iL makes a linear ramp increase from zero to a final value ip.

After a time period tpw, the pulse width timer output on wire 4 returns to zero, and the switch turns off. The voltage on wire 10 then makes a transition from approximately zero to the voltage Vin plus Vld. An ideal diode is assumed for this example, although use of a practical diode will not alter the conclusions of this discussion. During time t2, the inductor discharges its stored energy in the form of current into the load device Vld, and iL decreases to near zero.

After the inductor current is discharged, the voltage on wire 10 moves back towards the input voltage Vin. Stray capacitance plus the capacitance of the diode 13 and switch 7 interact with the inductor L item 11 to create a resonant circuit. As a result, the voltage on wire 10 exhibits a damped sine wave ringing waveform as shown during time interval t3. The energy stored in this ringing is usually of secondary concern, and causes only small changes in the circuit operation, depending on the value of the voltage on wire 10 when the pulse on wire 6 turns on again. At the end of time period t3, the pulse on wire 6 turns on again, repeating the operation cycle.

The power converter as described above is a constant duty cycle flyback power converter, and has the desirable property that its input voltage divided by its input current represents a substantially constant resistance over most of the input voltage range. This property is important since a resistive load on an AC power input will have a high power factor (PF). A power factor approaching unity is desirable for meeting some regulatory requirements.

FIG. 3 shows more detail of implementation of the constant duty cycle flyback power converter. In this figure, the pulse width timer 3 has been shown in detail for the purpose of developing the mathematical properties of this circuit. When the voltage on wire 2 is high, it sets flip flop 26 so its Q output is a logic high, and through the inverter 25 makes one input of the logical AND gate 27 low. Therefore the output of gate 27 is a logic low. In addition, the high level on wire 2 turns on transistor M2, discharging capacitor C1 denoted 21 to a voltage near ground, and making the voltage on wire 24 near zero. Since VPW is a non-zero voltage substantially greater than ground, the output of comparator 29 goes to a logic low state. The above conditions describe the reset state of the pulse width timer when it is being readied to generate another pulse.

Now when the oscillator output voltage on wire 2 goes from high to low, the transistor 20 turns off, the set input of the flip flop 26 turns off, and one input of AND gate 27 turns on. Since the Q output of flip flop 26 is already high, the output of AND gate 27 then goes high on wire 28, turning on the switch transistor 7. The driver amplifier 5 shown previously is not detailed here as it does not change the function of the circuit. As a result of this action, the timer voltage on wire 24 is changing in a positive going linear fashion due to current source i1 denoted 23 charging capacitor 21, and the inductor current iL begins to increase, due to the source voltage Vin from 8 being impressed across it by switch 7. When the voltage on the timing node 24 reaches the value of the comparator 29 reference Vpw, the comparator 29 causes its output to go high, turning on the set input of flip flop 26. The Q output of flip flop 26 then goes low, causing AND gate 27 to make its output low on wire 28. The switch transistor 7 then turns off, interrupting the flow of current into the inductor. Voltage flyback on wire 10 in a positive direction then causes diode D denoted 13 to discharge the inductor current into the load device Vld.

Equations describing this operation can be written as shown in FIG. 4. Starting with the capacitor relationship of I=C*(dV/dT), we get the pulse width tpw=(C1*Vpw)/i1 as in equation (1). The pulse width is directly proportional to the capacitance C1 and the reference voltage Vpw, and inversely proportional to the charging current i1. If we then define E as the energy transferred per pulse of the inductor, and P as the average input power of the circuit, assuming no losses, then P=F*E, where F is the frequency of the oscillator. The energy stored in an inductor carrying a current ip is E=(L*ip*ip)/2. In our case the current ip is the value attained just at the end of the switch control pulse on wire 28 and as marked in FIG. 2 on the iL waveform. In addition, the voltage across the inductor is V=L*(dI/dT), which can be rewritten for our case as ip=(Vin*tpw)/L. Using all of the above relations, we get the equation for the input power as P=Vin*Vin*(F*tpw*tpw)/(2*L) as in equation (2). Comparing this with the equation for power dissipated in a resistive load of value Rin, we then get equation (3), which shows Rin=(2*L)/(F*tpw*tpw).

The important item from the above equations is that if L, F, and tpw are constant, then the input effective resistance Rin will be constant as Vin varies. Since F and tpw are constant, the switch is running at constant duty cycle. Note that if L varies, the input resistance Rin varies directly, and the input power varies inversely with L. A constant input resistance Rin would make possible a power converter with a power factor PF approaching the ideal value of 1.0.

A corollary to the above operation is to produce constant input power operation instead of constant input resistance. By solving equation (1) for tpw in equation (3) and solving for i1, we get equation (4), which shows that if i1 is proportional to Vin and all other variables are constant, then the input power of the constant duty cycle converter will be constant. This characteristic can be used to adjust the value of tpw according to the peak magnitude of the input voltage Vin on each half cycle of a rectified AC voltage source used for Vin, so that the input power of the converter will remain constant as the peak input voltage instantaneously varies. The peak voltage measurement is done in a manner with slow response compared to the AC voltage waveform variation, so the time of the pulse tpw remains essentially constant during each half cycle of the waveform time.

FIG. 5 shows one simple means of providing the timer charging current it proportional to Vin. Many other methods are possible according to the state of the art. In this circuit advantage is taken of the fact that the voltage swing on timer wire 2 is only a few volts, whereas the voltage Vin on wire 9 may reach peak values Vpk of up to 170 volts if the AC input power source Vac denoted 35 is nominally 120 volts RMS amplitude, as is commonly used for home lighting in the United States of America. Full wave bridge rectifier 35 as known in the state of the art converts the incoming AC voltage to pulsating DC voltage with a sinusoidal shape similar to the incoming wave shape, except that the voltage has only positive polarity on each half cycle of the incoming wave Vac from 35. Diode D2 will conduct the peak voltage on wire 9 to charge the capacitor C2 denoted 32, charging the wire 30 to the value Vpk. Therefore Vpk may reach values of up to 170 volts, impressing that voltage across the resistor R1 denoted 31. The timer capacitor 21 will then receive a charging current it equal to (Vpk minus the voltage on wire 24) divided by R1, a nearly constant value with small variations at twice the incoming AC frequency, and an average value proportional to the input voltage Vac from 35. This satisfies the requirements of equation (4) in FIG. 4 to give a power converter input power which is essentially independent of the input voltage Vac for moderate variations about the nominal designed operating voltage. Since the power compensation is done with the slowly varying peak voltage detection, the instantaneous response of the converter to the input line voltage is still essentially resistive. This give a high power factor as desired.

Figure 6:
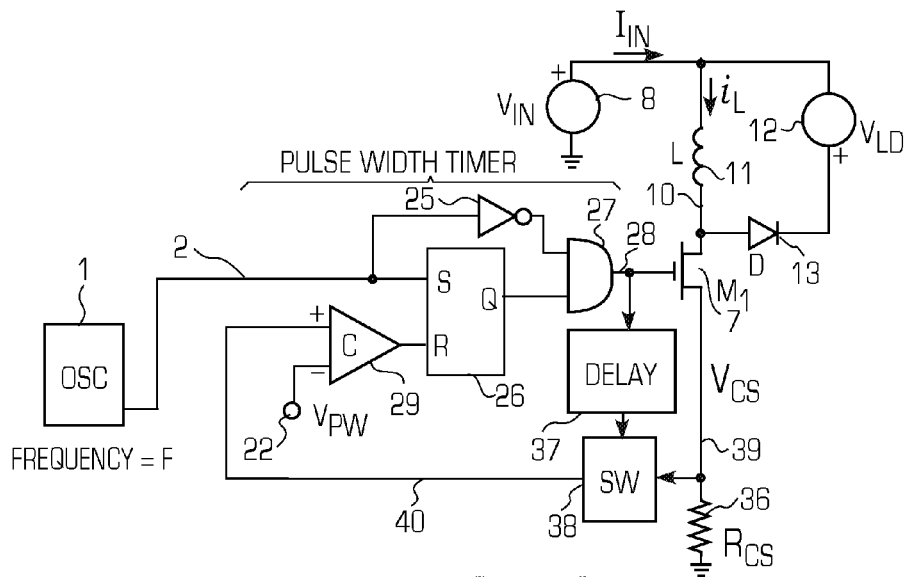
FIG. 6 depicts an embodiment of a constant peak current power converter.

FIG. 6 shows a constant peak current power converter as known in prior art. This design is very similar to the circuit shown previously in FIG. 3, with the method of timing the power converter switch on time tpw changed. The timing capacitor C1, discharge switch M2, and current source i1 of FIG. 3 are replaced with a new means of controlling the pulse time tpw on wire 28. Specifically, the resistor Rcs denoted 36 is added in series with the source-to-ground connection of switch transistor M1 so that a small voltage Vcs proportional to the switch current iL is developed on wire 39. This voltage Vcs is typically chosen to be small compared to the voltage on wire 28 so that it does not interfere with proper operation of switch 7.

The following analysis makes the assumption that the constant peak current power converter always runs in a discontinuous operating mode, so that the inductor current is discharged completely in each operation cycle. The voltage Vcs takes the form of a triangle similar to the current iL shown in FIG. 2 for the time period t1 between the times 0 and tpw. At the end of the interval t1, the voltage on 39 will be Vcs=ip*Rcs and gives information about the inductor current. Since the power output is proportional to the inductor peak current ip as discussed previously, controlling the peak current ip to a known reference value will control the power output of the power converter.

Comparison of the voltage Vcs with a reference voltage Vpw item 22 by comparator 29 gives a reset pulse to flip flop 26 to terminate the switch 7 drive pulse. Each time an oscillator cycle occurs on wire 2, the switch 7 will turn on and conduct current until the inductor current iL reaches the desired peak value of ip.

One difficulty of using the voltage Vcs on 39 to terminate the switch 7 pulse is that the current at the source of switch 7 contains additional currents which can interfere with the pulse termination measurement by the comparator 29. One of these is an impulse of charge which is caused by the gate-to-source capacitance of switch 7 when the voltage on wire 28 makes a transition from zero to a logic high level. Another interfering current is an impulse of charge which is caused by the total nodal capacitance on wire 10. When the switch 7 turns on, the wire 10 must discharge from a high voltage to near zero, and the switch connects this discharge current to its source terminal. A voltage pulse is caused on Vcs wire 39 as a result due to both of the switch 7 turn on activities.

One solution for avoiding problems with the undesired voltage impulses discussed above is to use an analog switch as known in the state of the art in series with the Vcs signal from wire 39 to the comparator 29 input on wire 40. This prevents the voltage impulses, which can be as large as the desired signal, from upsetting the operation of comparator 29. A delay circuit 37 activates the analog switch 38 a short time after the signal on wire 28 turns on the power switch 7. This delay is sufficient that the undesired noise impulses will be ignored by the comparator 29. Other solutions may also be used as known in the state of the art for preventing false resetting of the flip flop 26 by undesired noise pulses on the current sensing voltage Vcs on wire 36.

Since Vpw=Vcs defines the end of the inductor 11 charging time, we have ip=Vcs/Rcs=Vpw/Rcs as shown in equation (5) of FIG. 7. Using the inductor energy equation E=(L*ip*ip)/2 as before, we then get the average power input to the converter as P=(F*L*Vpw*Vpw)/(2*Rcs*Rcs) shown in equation (6). Therefore it follows that this type of power converter has the advantage of an average input power which is constant if the comparator reference voltage Vpw is constant, and which does not vary with the input voltage Vin. However, since the input power is constant with voltage, it follows that the input resistance of the power converter is not constant, and in fact must be proportional to the square of the input voltage Vin. The average input current Iin will be inversely proportional to the input voltage Vin as shown in equation (7). Therefore this type of power converter will give a very poor power factor for its input voltage Vin.

A point of special importance in the results for the constant peak current power converter is that in equation (6) we see that the input power is directly proportional to the inductor 11 value L if the operating frequency F, reference voltage Vpw 22, and resistor Rcs 36 are kept constant. Compare this to the power result for the constant duty power converter which showed in equation (2) that the power input is proportional to the inverse of inductor 11 with value L if all other operating parameters are kept constant.

Combining the circuits of FIGS. 3 and 6 results in the novel design presented in FIG. 8. This design incorporates both the timer element using M2, C1, and it from FIG. 3 with the inductor current sampling using Rcs of FIG. 6 in a new way to produce a composite timing ramp voltage on wire 24. Operation begins with switch M1 item 7 off and discharge device M2 item 20 on, making the current iL zero and the voltage on wire 24 zero. When the oscillator output on wire 2 goes to zero, M2 turns off, releasing the timing node on wire 24, and wire 28 goes high, turning on switch 7. Inductor current begins to increase in a linear ramp fashion, and the voltage across capacitor 41 increases in a linear ramp fashion due to the constant charging current i1. The sum of these two voltages then appears on wire 24.

Comparator 29 will change its output state from zero to high when the increasing voltage on wire 24 becomes equal to the reference voltage Vpw. At that time, the flip flop 26 will change its output state from high to low, causing the gate drive signal for switch 7 on wire 28 to go low, turning off switch 7. This terminates the inductor charging current through switch 7, and the inductor voltage on wire 10 goes positive, transferring stored current to the load Vld denoted 12 through diode 13 as before.

The important distinction of this design in FIG. 8 is that a portion of the timing information for wire 24 is derived from the current through the inductor 11, and the remainder is derived from linear charging of the capacitor 41. Consider what happens if value L of the inductor 11 increases. The voltage feedback from the inductor current Vcs will diminish as a function of time, whereas the voltage generated by the capacitor 41 charging will stay constant. The result is that the time period of the switch 7 conduction tpw will increase, as more time will be required for the composite voltage to reach Vpw. However, the conduction time change will be less than in the case of the constant peak current power converter of FIG. 6.

FIG. 9 presents equations which analyze the operation of the inductance invariant converter of FIG. 8. Operation of this circuit is similar to its two predecessors, with the exception of how the timing ramp in the pulse width timer is produced. Examination of the circuit of FIG. 8 shows that the voltage on wire 24 will be the sum of the voltages generated before. Solving equation (1) of FIG. 4 for Vpw, we get Vpw=(i1*tpw)/C1, and solving equation (5) of FIG. 7 for Vpw, we get Vpw=(Vin*tpw*Rcs)/L. Combining these, we find the trip point for comparator 29 will be Vpw=[(i1/C1)+(Vin*Rcs)/L)]*tpw as given in equation (8). The ramp voltage is the sum of two components, one derived from a current charging a capacitor, and the other derived from the input voltage impressed across the inductor L producing a current which creates a voltage when flowing through a current sampling resistor Rcs. Any means as known in the state of the art could be used to add together said ramp voltages without altering the fundamental operation principle of this circuit.

Consider the objective of finding the condition for the fixed parameters in the circuit of FIG. 8 for the effect of variation of the inductor L to be zero change in the input power. Taking the derivative of equation (9) with respect to L and setting the result to zero, we get the resulting equation (10) of i1/C=(Vin*Rcs)/L, or L=(C*Vin*Rcs)/i1. Compare this result to the original timing equation given in equation (8). Equation (10) basically says that at the normal operating point of the circuit, the portion of the voltage ramp on wire 24 caused by the capacitor charging is the same as the portion caused by the input voltage Vin impressed across the inductor L. When this condition is met, the circuit performance variation with changes in the value of L will be minimized.

The relationship given in equation (10) is effective at only one circuit operating point, since both the input voltage Vin and capacitor charging current i1 are involved. Computer simulations showed that when this condition is met and i1 is constant, the input current of the circuit would vary as approximately the square root of the applied instantaneous input voltage Vin as Vin is varied from zero to its maximum normal value. Obtaining an input current which varies approximately in proportion to the input voltage Vin requires that the reference voltage Vpw is a constant plus a variable amount proportional to Vin. Using approximately the same values for the constant and variable portions at the nominal Vin gives good results. In this simulation case, the input current linearly varies in proportion to Vin as shown in FIG. 10), making the input resistance of the circuit also nearly constant. The corresponding curve for the load current is a measure of the circuit input power, since the load voltage Vld is constant. As seen in FIG. 11, the load current follows a parabolic curve, which indicates again that the converter input power is proportional to the square of the input voltage Vin, and the converter input resistance is constant.

It is further found from simulation and experiment that if the current it denoted 23 used to charge capacitor C denoted 41 is made to vary with the peak of the input voltage Vin, then the input power can be made to have only a small variation over a range of input RMS voltages Vin. The current it is found to need to vary as the square of the input voltage Vin, so an approximation is used over the Vin range of +/−15%. The current it is made to change with a linear slope that is twice the slope that would result from direct use of Vin as done with the resistor R1 denoted 31 in FIG. 5. This is an approximation to the slope of a straight line which is tangent to the parabolic curve represented by the voltage Vin squared. The compensation obtained in this manner is found to give an input power variation of +/−2 percent for an input voltage Vin variation of +/−15%. This compensation is satisfactory for most lighting applications.

A circuit in which the Vin variation is compensated in the manner discussed above is shown in FIG. 12. As before, the gate drive amplifier 5 is not shown since it does not alter the basic operation of the circuit. This circuit is similar in operation to the one of FIG. 8, with additional items to make the instantaneous input resistance Rin=Vin/Iin essentially constant, and to compensate for the input voltage Vac denoted 35 variation in RMS amplitude. Constant input resistance Rin is achieved by using a voltage divider composed of R2 denoted 42, R3 denoted 43, and R4 denoted 44 to produce the reference voltage Vpw for the comparator 29 on wire 22. The voltage 45 has the value Vr and is constant, so the voltage Vpw on wire 22 varies as Vin on wire 9 varies, but to a lesser degree. The resistor values are chosen to meet the criteria discussed above, and give an average input current Iin for the power converter which is proportional to the input voltage Vin if no other Vin compensation circuits are in use. Capacitor C3 denoted 46 provides the current pulses required by inductor 11, so that the current IM is the average over the complete operation cycle of the power converter. This arrangement produces an effectively resistive input characteristic for the power converter, but does not produce constant average power when the RMS value of the AC input voltage 35 changes.

Provision of constant average power may be done as shown in FIG. 12 by using a constant current sink 47 of value i2 to subtract some of the charging current provided by resistor 31 of value R1. The current through R1 varies directly in proportion to the variation of the input voltage peak Vpk on wire 30 as before and therefore in proportion to the average RMS value of the AC voltage from the source 35. Since part of the current generated by R1 is subtracted by i2, proper choice of the value of i2 can effectively increase by a factor of 2 the variation of charging current i1 going to capacitor 41 for operation near the nominal operating point. Any other method known in the state of the art for producing a capacitor charging current i1 which changes at a rate faster than the RMS input voltage may also be used. The requirement for a double slope charging current discussed previously is therefore satisfied.

As presented above, the circuit of FIG. 12 provides all three properties desired at the beginning of this disclosure. Firstly, the use of combined voltages from charging a capacitor with a current and from applying the input voltage Vin across the inductor 11 gives the valuable property that the circuit is not affected for small variations of the inductor 11 value L. Secondly, use of a reference voltage Vpw for the timing comparator 29 which fractionally varies about a nominal value Vr according to changes in the input voltage Vin gives an instantaneous input current which changes in a manner proportional to the input voltage, so the power converter has a constant input resistance and high power factor. Finally, use of a capacitor charging current it which varies about a nominal value according to the average RMS value of Vac but more than in proportion to the Vac changes gives a power converter which has an essentially constant average input power.

The figures shown above disclose methods which are capable of creating a circuit with the desirable properties as outlined in the original objectives. Any other circuit as known in the state of the art for creating the various functional portions of FIG. 12 may be used by a skilled practitioner without changing the fundamental properties of this novel design. Specifically the voltage Vpw may be created by any method of adding a portion of a varying voltage to a fixed reference voltage. The current i1 may be created by any method of producing a current which varies more than in proportion to its controlling voltage, and the ramp voltage on wire 24 may be created by any method for adding together two voltages, one from a current charging a capacitor 41, and the second in proportion to the current flowing through the inductor 11 used for storing energy. Other means of generating the pulse width timer circuits may be used without altering the fundamental operating principle of this power converter, which is that the addition of two ramp voltages from different sources enables compensating for variations in the value L of the power inductor 11.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A power converter comprising:
   an inductor comprising a first terminal and a second terminal;
   a voltage source coupled to the first terminal of the inductor; and
   a pulse width timer coupled to the second terminal of the inductor, the pulse width timer comprising:
   a transistor comprising a gate and a first terminal and a second terminal, the first terminal of the transistor coupled to the inductor; and a capacitor coupled to the transistor via the second terminal;

wherein a timing characteristic of the pulse width timer is based on current through the inductor and charging of the capacitor; and wherein the capacitor is coupled to the second terminal through an analog switch.

2. A power converter comprising:

a voltage source;

an inductor coupled to the voltage source;

a load coupled to the inductor; and a pulse width timer for controlling current through the inductor, the pulse width timer comprising:

a transistor comprising a gate and a first terminal and a second terminal, wherein the first terminal is coupled to the inductor; and a capacitor coupled to the transistor via the second terminal;

wherein a timing characteristic of the pulse width timer is based on current through the inductor and charging of the capacitor; and wherein the capacitor is coupled to the second terminal through an analog switch.

3. A power converter comprising:

a voltage source;

an inductor coupled to the voltage source;

a load coupled to the inductor;

an oscillator; and a pulse width timer for controlling current through the inductor, the pulse width timer comprising:

a transistor comprising a gate and a first terminal and a second terminal, wherein the first terminal is coupled to the inductor; and a capacitor comprising a first terminal and a second terminal, the first terminal of the capacitor coupled to the second terminal of the transistor through an analog switch and the second terminal of the capacitor coupled to the voltage source;

wherein the gate of the transistor is controlled by the oscillator and a voltage of the second terminal of the capacitor.

* * * * *